(12) United States Patent
Cheng et al.

(10) Patent No.: US 9,856,008 B2
(45) Date of Patent: Jan. 2, 2018

(54) COMPOSITE STRUCTURE AND METHODS OF FORMING THEREOF

(71) Applicant: The Boeing Company, Seal Branch, CA (US)

(72) Inventors: Jiangtian Cheng, Mukilteo, WA (US); Derek Paul Vetter, Olympia, WA (US); Patrick Alan Woodard, Renton, WA (US); Forouzan Behzadpour, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 438 days.

(21) Appl. No.: 14/281,456

(22) Filed: May 19, 2014

(65) Prior Publication Data

US 2016/0144943 A1  May 26, 2016

(51) Int. Cl.
| | |
|---|---|
| *B64C 1/06* | (2006.01) |
| *B29C 70/34* | (2006.01) |
| *B29C 70/86* | (2006.01) |
| *B29C 37/00* | (2006.01) |
| *B29D 99/00* | (2010.01) |
| B29L 31/30 | (2006.01) |
| B29K 705/00 | (2006.01) |

(52) U.S. Cl.
CPC ............ *B64C 1/06* (2013.01); *B29C 37/0082* (2013.01); *B29C 70/342* (2013.01); *B29C 70/865* (2013.01); *B29D 99/0003* (2013.01); *B29D 99/0014* (2013.01); *B29K 2705/00* (2013.01); *B29L 2031/3076* (2013.01); *Y02T 50/433* (2013.01)

(58) Field of Classification Search
CPC ..... B64C 1/06; B29C 70/342; B29C 37/0082; B29C 70/865; B29D 99/0003; B29D 99/0014; B29L 2031/3076; B29K 2705/00

USPC ............................................ 428/188; 29/428
See application file for complete search history.

(56) References Cited

U.S. PATENT DOCUMENTS

| | | | |
|---|---|---|---|
| 4,109,435 A | 8/1978 | Loyd | |
| 6,562,436 B2 | 5/2003 | George et al. | |
| 2005/0178083 A1* | 8/2005 | Fournie ................. | B29C 70/345 52/782.1 |
| 2007/0175171 A1 | 8/2007 | Delgado et al. | |
| 2013/0164465 A1* | 6/2013 | Lacombe .................. | B64C 1/06 428/34.1 |

FOREIGN PATENT DOCUMENTS

| | | |
|---|---|---|
| EP | 1537982 A1 | 6/2005 |
| FR | 2986990 A1 | 8/2013 |

OTHER PUBLICATIONS

Extended European Search Report for related application 15163109.0 dated Oct. 1, 2015; 7 pp.

* cited by examiner

*Primary Examiner* — Brian Handville
(74) *Attorney, Agent, or Firm* — Armstrong Teasdale LLP

(57) ABSTRACT

A composite structure is provided. The composite structure includes a first stiffener, a second stiffener, and an intermediate structure positioned between the first and second stiffeners such that the first stiffener is coupled to a first side of the intermediate structure, and such that the second stiffener is coupled to a second opposing side of the intermediate structure. A first radius gap is defined at least partially between the first stiffener and the intermediate structure, and a second radius gap is defined at least partially between the second stiffener and the intermediate structure.

20 Claims, 5 Drawing Sheets

COMPOSITE STRUCTURE AND METHODS OF FORMING THEREOF

BACKGROUND

The field of the present disclosure relates generally to composite structures and, more specifically, to structures that facilitate reducing a size of radius gaps in composite structures.

Cracking of integrally stiffened composite structures, especially in aerospace applications, often initiates in a radius filler (i.e., noodle) located at an interface between a skin and integral stiffening elements of the composite structures. At least some known radius fillers are formed at least partially from an amount of resin. Cracks in the resin may form during manufacture of the composite structures as a result of improper tooling, improper handling of tools, and/or residual tensile strain. For example, residual tensile strain in composite structures may form as a result of a mismatch between the coefficients of thermal expansion creating a strain environment in the radius filler that exceeds the critical cracking strain of the resin.

Exemplary radius filler materials include, but are not limited to, pre-impregnated (i.e., prepreg) composite materials (e.g., layered strips and/or rolled prepreg composite material), and/or pure resin. In at least some known composite structures, crack propagation in the radius filler can cause delamination failure in adjacent composite components. More specifically, crack propagation in the radius filler may initiate failure of layered composites joined at the radius gaps. While limiting the formation of cracks in the radius filler would ensure the integrity of the laminated joints, preventing cracks from forming entirely is generally difficult, if not impossible. Moreover, the difficulty in limiting crack formation in radius fillers increases as composite structures are fabricated in increasingly large sizes.

BRIEF DESCRIPTION

In one aspect, a composite structure is provided. The composite structure includes a first stiffener, a second stiffener, and an intermediate structure positioned between the first and second stiffeners such that the first stiffener is coupled to a first side of the intermediate structure, and such that the second stiffener is coupled to a second opposing side of the intermediate structure. A first radius gap is defined at least partially between the first stiffener and the intermediate structure, and a second radius gap is defined at least partially between the second stiffener and the intermediate structure.

In another aspect, an intermediate structure for use in defining a first radius gap and a second radius gap between stiffeners in a composite structure is provided. The intermediate structure includes a base portion coupled adjacent the first and second radius gaps within the composite structure, and an elongated portion coupled to the base portion. The base portion is positioned to separate the first radius gap from the second radius gap, and the elongated portion extends away from the base portion to facilitate modifying a moment of inertia of the composite structure.

In yet another aspect, a method of forming a composite structure is provided. The method includes coupling a first stiffener to a base structure of the composite structure, coupling a second stiffener to the base structure, and positioning an intermediate structure between the first and second stiffeners such that the intermediate structure separates a first radius gap defined at least partially between the first stiffener and the intermediate structure from a second radius gap defined at least partially between the second stiffener and the intermediate structure.

DETAILED DESCRIPTION

The implementations described herein relate to composite structures designed to facilitate reducing the likelihood of crack propagation in radius fillers in the composite structures. In the exemplary implementation, the composite structure includes a first stiffener, a second stiffener, and an intermediate structure positioned therebetween. In conventional composite structures, the first and second stiffeners are coupled directly to each other, and are oriented such that a large radius gap is formed therebetween. The composite structure described herein implements the intermediate structure to facilitate splitting the large radius gap forming smaller radius gaps, such that filler material therein is less likely to crack during formation of the composite structure. Moreover, the intermediate structure may be modified to include various features that facilitate improving a moment of inertia of the composite structure, that facilitate restricting movement of the intermediate structure within the composite structure, and that facilitate reducing wrinkling of composite plies at the interface, for example. As such, defining smaller radius gaps in the composite structure facilitates reducing the likelihood of crack propagation from forming therein, and thus facilitates maintaining the integrity of the composite structure.

Figure 1:
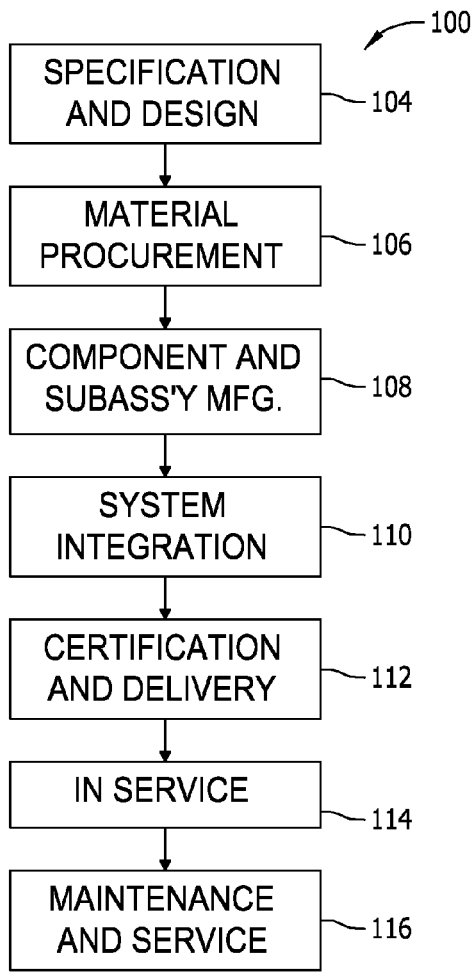
FIG. 1 is a flow diagram of an exemplary aircraft production and service method.
Figure 2:
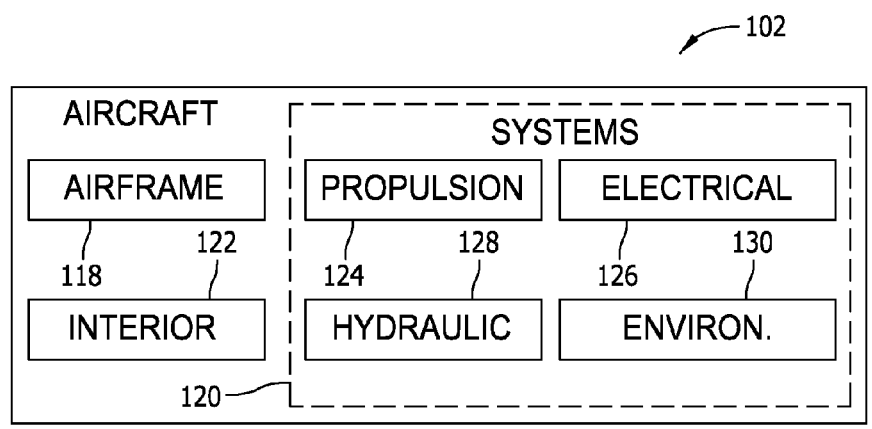
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service method 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
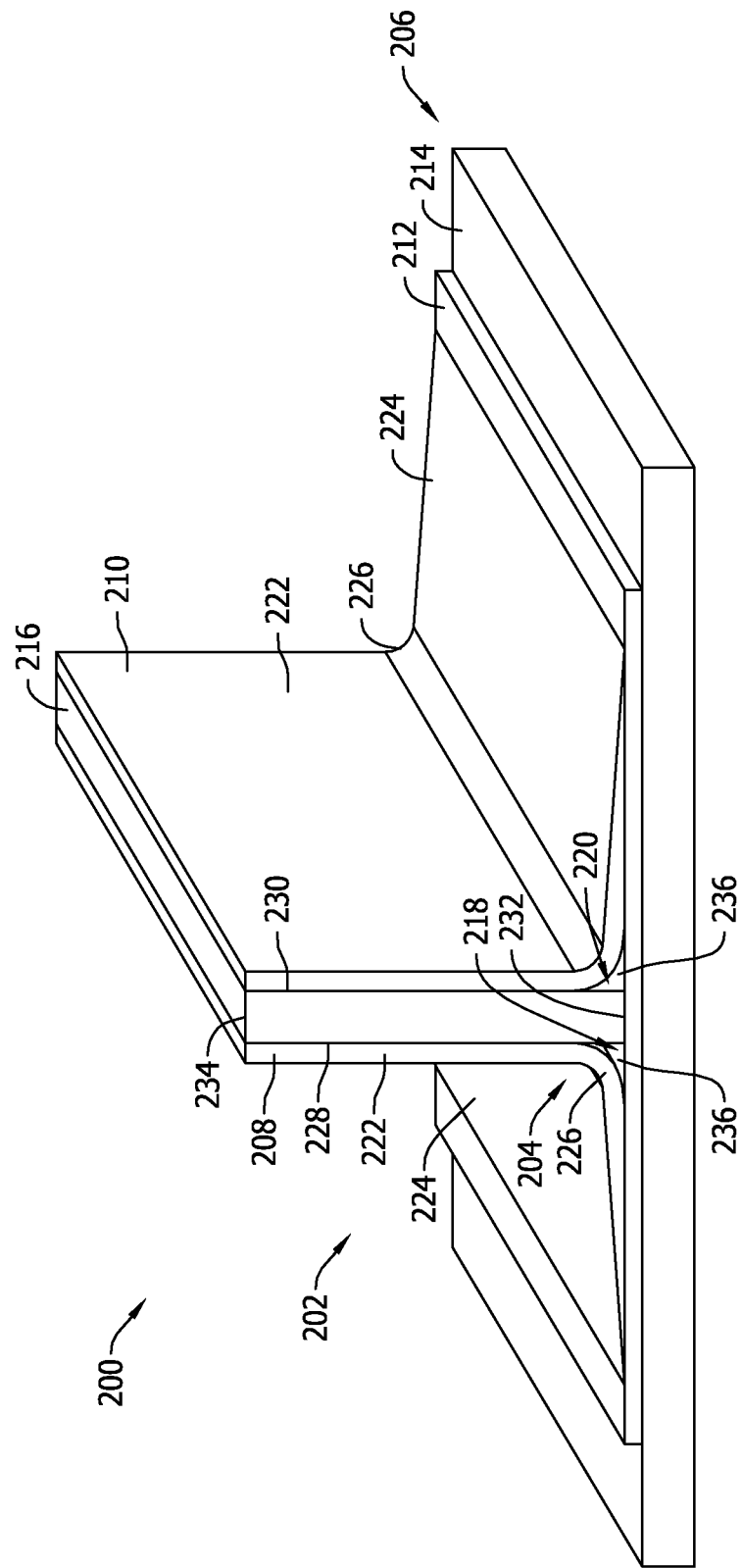
FIG. 3 is a schematic illustration of an exemplary composite structure that may be used in the aircraft shown in FIG. 2.
Figure 4:
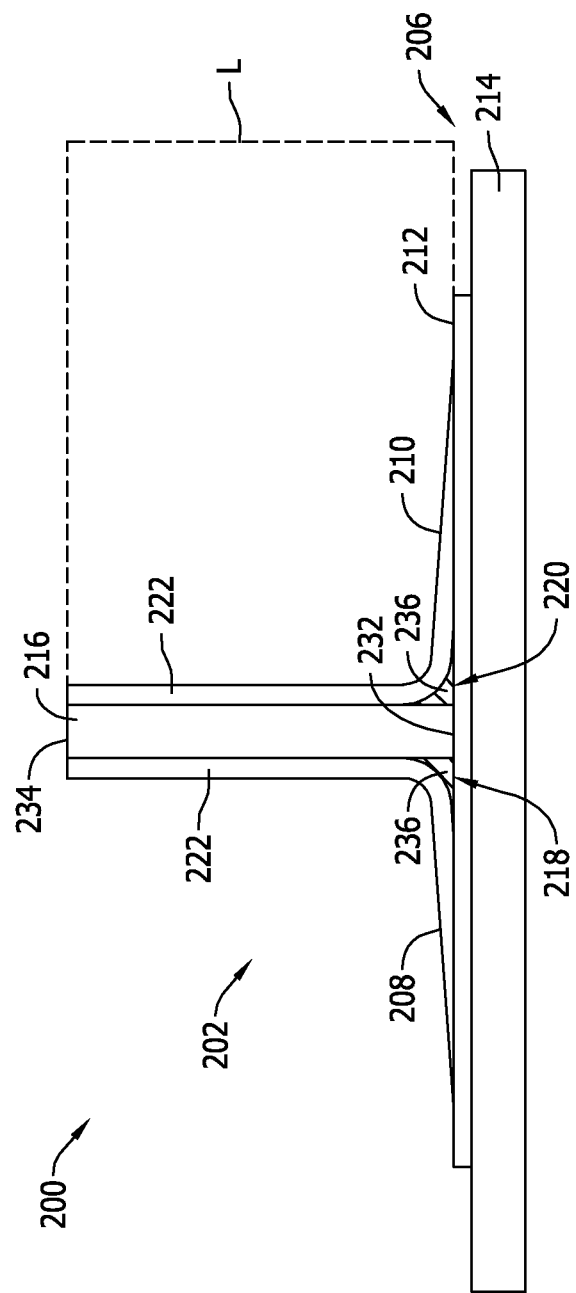
FIG. 4 is a front view of the composite structure shown in FIG. 3.

FIG. 3 is a schematic illustration of an exemplary composite structure 200 that may be used in aircraft 102 (shown in FIG. 2), and FIG. 4 is a front view of composite structure 200. In the exemplary implementation, composite structure 200 includes a plurality of components 202 coupled together to form a T-joint 204. Specifically, components 202 include a base structure 206, a first stiffener 208 coupled to base structure 206, and a second stiffener 210 coupled to base structure 206. Base structure 206 includes a plank 212 and a skin panel 214 each oriented such that first and second stiffeners 208 and 210 are coupled to plank 212. Alternatively, plank 212 may be omitted and first and second stiffeners 208 and 210 may be coupled directly to skin panel 214. Composite structure 200 also includes an intermediate structure 216 positioned between first and second stiffeners 208 and 210.

In the exemplary implementation, components 202 are oriented such that a first radius gap 218 is defined between first stiffener 208, intermediate structure 216, and base structure 206, and such that a second radius gap 220 is defined between second stiffener 210, intermediate structure 216, and base structure 206. More specifically, each of first and second stiffeners 208 and 210 include a first portion 222, a second portion 224, and a bent portion 226 extending therebetween. First portion 222 of first stiffener 208 is coupled to a first side 228 of intermediate structure 216, and first portion 222 of second stiffener 210 is coupled to a second side 230 of intermediate structure 216. Second portions 224 of first and second stiffeners 208 and 210 are coupled to base structure 206 and extend away from intermediate structure 216 such that bent portions 226 at least partially define first and second radius gaps 218 and 220.

Intermediate structure 216 is positioned between first and second stiffeners 208 and 210 to facilitate defining and separating first and second radius gaps 218 and 220. Intermediate structure 216 includes a first end 232 coupled to base structure 206, and a second end 234 extending along a length L of first and second stiffeners 208 and 210 such that intermediate structure 216 extends between first portions 222 of first and second stiffeners 208 and 210. As such, intermediate structure 216 facilitates isolating first radius gap 218 from second radius gap 220 to facilitate inhibiting crack propagation in a filler structure 236 positioned in first and second radius gaps 218 and 220. Specifically, positioning intermediate structure 216 between first and second stiffeners 208 and 210 facilitates splitting a radius gap (not shown) defined between first and second stiffeners 208 and 210 if intermediate structure 216 was not positioned therebetween. As such, the radius gap is split into smaller radius gaps 218 and 220 to facilitate reducing the likelihood of crack formation in filler structure 236.

Intermediate structure 216 may be fabricated from any material that enables composite structure 200 to function as described herein. Exemplary materials used to form intermediate structure 216 include, but are not limited to, a composite material, and pre-impregnated (i.e., prepreg) composite material. As such, the material used to fabricate intermediate structure 216 is substantially compatible with other components 202 of composite structure 200, and facilitates maintaining the integrity of composite structure 200 when implemented as fly-away tooling.

Figure 5:
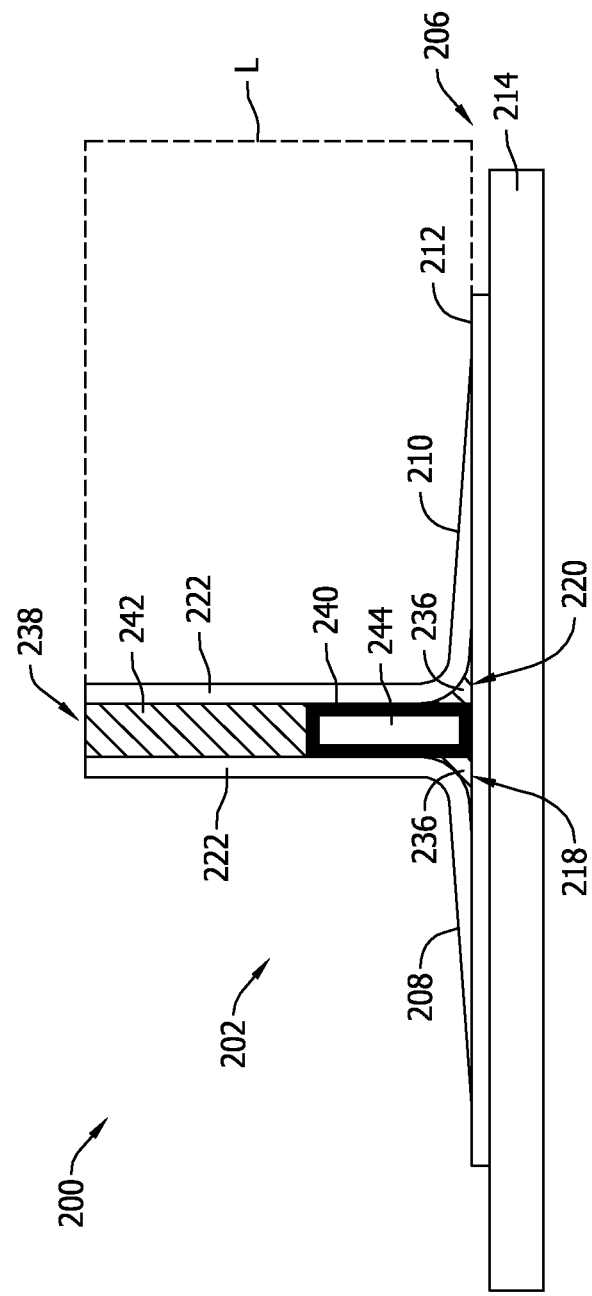
FIG. 5 is a schematic illustration of an alternative intermediate structure that may be used with composite structure shown in FIG. 4.

FIG. 5 is a schematic illustration of an alternative intermediate structure 238 that may be used with composite structure 200. In the exemplary implementation, intermediate structure 238 includes a base portion 240 coupled to base structure 206, and an elongated portion 242 coupled to base portion 240 and extending away from base portion 240 between first portions 222 of first and second stiffeners 208 and 210. More specifically, base portion 240 is positioned adjacent first and second radius gaps 218 and 220, and extends only partially along length L of stiffeners 208 and 210. Elongated portion 242 is coupled to base portion 240 and extends from base portion 240 along a remainder of length L.

In the exemplary implementation, base portion 240 includes an internal cavity 244 extending therethrough that facilitates reducing a weight of base portion 240. Reducing the weight of base portion 240 and positioning elongated portion 242 over base portion 240 facilitates modifying a weight distribution within composite structure 200. Specifically, coupling base portion 240 to plank 212 facilitates moving the moment of inertia of composite structure 200 away from base structure 206. As such, the mass of elongated portion 242 enables the size of first and second stiffeners 208 and 210 to be reduced while substantially maintaining the moment of inertia of composite structure 200 away from base structure 206.

In some implementations, base portion 240 is fabricated from a first material, and elongated portion 242 is fabricated from a second material different from the first material. For example, the first material is selected to be substantially compatible with the material used to fabricate components 202, and the second material is substantially similar to the material used to fabricate components 202. An exemplary first material includes, but is not limited to, titanium. As such, the first material enables base portion 240 to have a predetermined geometry, such as having internal cavity 244 extending therethrough, and facilitates maintaining the integrity of composite structure 200 when implemented as fly-away tooling. Exemplary second materials include, but are not limited to, a composite material, and prepreg composite material. Alternatively, base portion 240 and elongated portion 242 may be fabricated from any material that enables intermediate structure 238 to function as described herein.

As described above, filler structures 236 are positioned in first and second radius gaps 218 and 220 to facilitate maintaining a shape of composite structure 200 during fabrication thereof. Filler structures 236 have a cross-sectional shape that substantially corresponds to a cross-sectional shape of first and second radius gaps 218 and 220, and are fabricated from any material that enables composite structure 200 to function as described herein. For example, filler structure 236 may be fabricated from an amount of resin, composite material, and/or combinations thereof.

Figure 6:
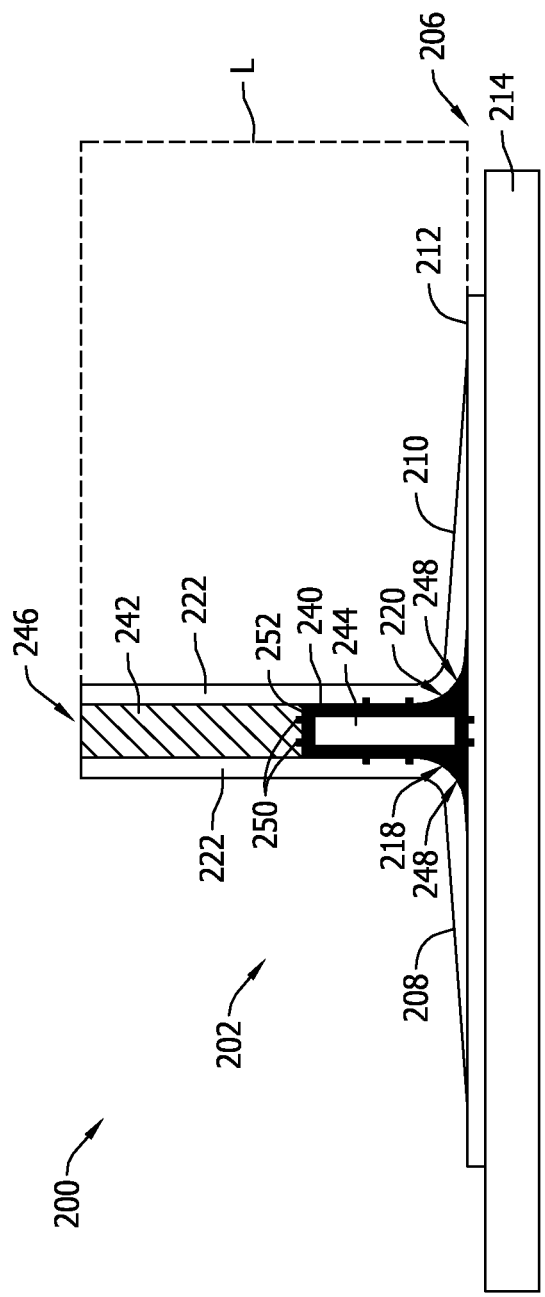
FIG. 6 is a schematic illustration of a further alternative intermediate structure that may be used with the composite structure shown in FIG. 4.

FIG. 6 is a schematic illustration of a further alternative intermediate structure 246 that may be used with composite structure 200. As described above, intermediate structure 246 includes base portion 240 coupled to base structure 206, and elongated portion 242 coupled to base portion 240 and extending between first portions 222 of first and second stiffeners 208 and 210. In the exemplary implementation, an alternative filler structure 248 is integrally formed with intermediate structure 246. More specifically, filler structures 248 are formed integrally with base portion 240 such that such that filler structure 248 and base portion 240 are each formed from the first material.

In one implementation, base portion 240 includes at least one protrusion 250 extending from an outer surface 252 thereof. Protrusions 250 extend toward components 202 to facilitate restricting movement of intermediate structure 246 relative to components 202. Specifically, in the exemplary implementation, protrusions 250 interlock with first stiffener 208, second stiffener 210, and plank 212 as heat and/or pressure are applied during formation of composite structure 200. The heat and/or pressure may be applied via a vacuum bagging process, and/or composite structure 200 may be placed in an autoclave (not shown).

The implementations described herein relate to intermediate structures for use in defining smaller radius gaps between adjacent stiffeners in a composite structure. The intermediate structure is positioned between the adjacent stiffeners to facilitate splitting a comparatively larger radius gap defined therebetween to form the smaller radius gaps. The smaller radius gaps are isolated from each other by the intermediate structure to facilitate reducing the likelihood of crack propagation therein. Specifically, radius fillers positioned in smaller radius gaps are generally less likely to be susceptible to crack propagation when forming the composite structure. As such, the intermediate structure described herein facilitates inhibiting cracks from initiating delamination of components and/or failure of joints in the composite structure.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A composite structure comprising:
   a first stiffener;
   a second stiffener;
   an intermediate structure positioned between said first and second stiffeners such that said first stiffener is coupled to a first side of said intermediate structure, and such that said second stiffener is coupled to a second opposing side of said intermediate structure;
   a first radius gap defined at least partially between said first stiffener and said intermediate structure; and
   a second radius gap defined at least partially between said second stiffener and said intermediate structure,
   wherein said intermediate structure comprises a base portion positioned adjacent said first and second radius gaps and an elongated portion extending away from said base portion, said base portion and said elongated portion having different weights such that an uneven weight distribution is formed along a length of said first and second stiffeners.

2. The composite structure in accordance with claim 1 further comprising a filler structure positioned within each of said first and second radius gaps, wherein said filler structure has a cross-sectional shape that substantially corresponds to a cross-sectional shape of each said first and second radius gaps.

3. The composite structure in accordance with claim 2, wherein said filler structure is integrally formed with said intermediate structure.

4. The composite structure in accordance with claim 1, wherein said base portion comprises an internal cavity extending therethrough.

5. The composite structure in accordance with claim 1, wherein said base portion is fabricated from a first material and said elongated portion is fabricated from a second material different from the first material.

6. The composite structure in accordance with claim 1, wherein said base portion comprises at least one protrusion extending from an outer surface of said base portion, said at least one protrusion restricting movement of said intermediate structure relative to said first and second stiffeners.

7. An intermediate structure for use in defining a first radius gap and a second radius gap between stiffeners in a composite structure, said intermediate structure comprising:
   a base portion coupled adjacent the first and second radius gaps within the composite structure, said base portion positioned to separate the first radius gap from the second radius gap; and
   an elongated portion coupled to said base portion, said elongated portion extending away from said base portion to facilitate modifying a moment of inertia of the composite structure, and said base portion and said elongated portion having different weights such that an uneven weight distribution is formed along the composite structure.

8. The intermediate structure in accordance with claim 7 further comprising a filler structure positioned within each of the first and second radius gaps, wherein said filler structure has a cross-sectional shape that substantially corresponds to a cross-sectional shape of each the first and second radius gaps.

9. The intermediate structure in accordance with claim 8, wherein said filler structure is integrally formed with said base portion.

10. The intermediate structure in accordance with claim 7, wherein said base portion comprises an internal cavity extending therethrough.

11. The intermediate structure in accordance with claim 7, wherein said base portion is fabricated from a first material and said elongated portion is fabricated from a second material different from the first material.

12. The intermediate structure in accordance with claim 7, wherein said base portion comprises at least one protrusion extending from an outer surface of said base portion, said at least one protrusion restricting movement of said intermediate structure relative to the stiffeners.

13. A method of forming a composite structure, said method comprising:
 coupling a first stiffener to a base structure of the composite structure;
 coupling a second stiffener to the base structure; and
 positioning an intermediate structure between the first and second stiffeners such that the intermediate structure separates a first radius gap defined at least partially between the first stiffener and the intermediate structure from a second radius gap defined at least partially between the second stiffener and the intermediate structure, wherein the intermediate structure includes a base portion positioned adjacent the first and second radius gaps and an elongated portion extending away from the base portion, the base portion and the elongated portion having different weights such that an uneven weight distribution is formed along a length of the first and second stiffeners.

14. The method in accordance with claim 13 further comprising positioning a filler structure within each of the first and second radius gaps.

15. The method in accordance with claim 14, wherein positioning a filler structure comprises integrally forming the filler structure with the intermediate structure.

16. The method in accordance with claim 13 further comprising extending at least one protrusion from an outer surface of the intermediate structure, the at least one protrusion restricting movement of the intermediate structure relative to the first and second stiffeners.

17. The method in accordance with claim 13 further comprising defining an internal cavity that extends through the base portion.

18. The method in accordance with claim 13 further comprising:
 forming the base portion from a first material; and
 forming the elongated portion from a second material different from the first material.

19. The method in accordance with claim 13, wherein positioning an intermediate structure comprises forming the intermediate structure from a two-piece assembly including the base portion and the elongated portion.

20. The composite structure in accordance with claim 1, wherein said intermediate structure is a two-piece assembly comprising said base portion and said elongated portion.

* * * * *